(12) United States Patent
Solferino

(10) Patent No.: US 8,181,621 B2
(45) Date of Patent: May 22, 2012

(54) INTERNAL COMBUSTION ENGINE WITH DYNAMIC BALANCING SYSTEM

(75) Inventor: Vince Paul Solferino, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 500 days.

(21) Appl. No.: 12/504,699

(22) Filed: Jul. 17, 2009

(65) Prior Publication Data

US 2011/0011363 A1   Jan. 20, 2011

(51) Int. Cl.
*F02B 75/06* (2006.01)
(52) U.S. Cl. ........................ 123/192.2; 474/110; 474/111
(58) Field of Classification Search .............. 123/192.2, 123/192.1, DIG. 5; 474/110, 111
See application file for complete search history.

(56) References Cited

U.S. PATENT DOCUMENTS

| 4,366,418 A * | 12/1982 | Mayama et al. | 315/326 |
|---|---|---|---|
| 4,572,025 A * | 2/1986 | Mitchell | 74/604 |
| 4,677,948 A * | 7/1987 | Candea | 123/192.2 |
| 4,703,724 A * | 11/1987 | Candea et al. | 123/192.2 |
| 5,383,813 A * | 1/1995 | Odai | 474/110 |
| 5,536,213 A * | 7/1996 | Macchiarulo et al. | 474/205 |
| 5,743,230 A * | 4/1998 | Yamazaki et al. | 123/195 H |
| 5,833,220 A * | 11/1998 | Nakakubo et al. | 267/226 |
| 6,045,471 A * | 4/2000 | Suzuki | 474/109 |
| 6,101,995 A * | 8/2000 | Itoh et al. | 123/195 A |
| 6,609,974 B2 * | 8/2003 | Mead et al. | 463/25 |
| 7,056,246 B2 | 6/2006 | Foster et al. | |
| 7,241,240 B2 * | 7/2007 | Cholewczynski | 474/111 |
| 7,390,276 B2 | 6/2008 | Tryphonos | |
| 7,429,226 B2 | 9/2008 | Tryphonos | |
| 2004/0045520 A1 | 3/2004 | Slopsema et al. | |
| 2007/0157900 A1 * | 7/2007 | Suzuki et al. | 123/196 AB |
| 2008/0173275 A1 * | 7/2008 | Koyama | 123/196 R |
| 2009/0064962 A1 * | 3/2009 | Ohsawa | 123/192.2 |

FOREIGN PATENT DOCUMENTS

| EP | 655568 A2 * | 5/1995 |
|---|---|---|
| EP | 1752645 A2 | 2/2007 |

* cited by examiner

*Primary Examiner* — Noah Kamen
*Assistant Examiner* — Long T Tran
(74) *Attorney, Agent, or Firm* — Jerome R. Drouillard; Julia Voutyras

(57) ABSTRACT

An internal combustion engine having a crankshaft and first and second balance shafts which are gear driven from one to the other, as a unilateral tensioning system applied to a flexible drive extending between the engine's crankshaft and a first one of the balance shafts, with the unilateral tensioning system being applied to the tension side alone of the flexible and inextensible drive element.

15 Claims, 3 Drawing Sheets

INTERNAL COMBUSTION ENGINE WITH DYNAMIC BALANCING SYSTEM

BACKGROUND OF THE DISCLOSURE

1. Field of the Disclosure

The present disclosure relates to an internal combustion engine having multiple balance shafts.

2. Related Art

Balance shafts have been used for controlling unwanted vibrations associated with internal combustion engines for many years. In some engines, dual balance shafts are used, with the balance shafts being driven at twice the rotational speed of the crankshaft. In an often used formula, a first balance shaft will be driven directly by the engine's crankshaft, via a chain or belt, with a second balance shaft being driven in the opposite rotational direction by a set of gears, with one gear being applied to each of the two balance shafts. Unfortunately, because of crankshaft rotational speed variations which are inherent with any reciprocating combustion engine, the balance shafts will tend to be accelerated and decelerated as the crankshaft accelerates and decelerates, with the result being that noise is generated by the meshing gears extending between the balance shafts.

It would be desirable to provide a system for preventing unwanted gear lash noise arising from a balance shaft system, at a reasonable cost and without adding additional parts to an engine.

SUMMARY OF THE DISCLOSURE

According to an aspect of the present disclosure, an internal combustion engine includes a crankshaft and a first balance shaft driven by a flexible and inextensible drive element extending between the crankshaft and the first balance shaft. The drive element has a slack side and a tension side. A second balance shaft is driven by the first balance shaft by means of a driving gear mounted to the first balance shaft which meshes with a driven gear mounted to the second balance shaft. According to another aspect of the present disclosure, a unilateral tensioning system is applied to the tension side of the drive element.

According to another aspect of the present disclosure, a flexible drive element included in an engine may be configured as either a chain, or a fiber reinforced elastomeric belt. In either case, the present tensioning system includes a single contactor which is urged into a tightening position against the flexible drive element at least in part by hydraulic pressure from a lubrication system of the engine, or by a resilient member, such as a tension spring, or both.

According to another aspect of the present disclosure, a single contactor used in a tensioning system may be configured as either a roller which is urged into a tightening position against the flexible drive element, or a shoe, which is similarly urged into a tightening position against the flexible drive element. In either case, the tensioning system allows the portion of the flexible drive element extending between the crankshaft and the first balance shaft to repeatedly and reversibly change in length in response to variations in the rotational speed of the crankshaft. This repeatable and reversible change in length is only momentary and is in response to variations in the rotational speed of the crankshaft.

It is an advantage of a system according to the present disclosure that unwanted balance shaft gear noise will be eliminated without the need for additional tensioning hardware.

It is an advantage that a system according to the present disclosure may be employed with not only a metallic chain, but also a fiber reinforced elastomeric belt drive element.

Other advantages, as well as features of a system according to the present disclosure, will become apparent to the reader of this specification.

DETAILED DESCRIPTION OF THE PREFERRED EMBODIMENTS

Figure 4:
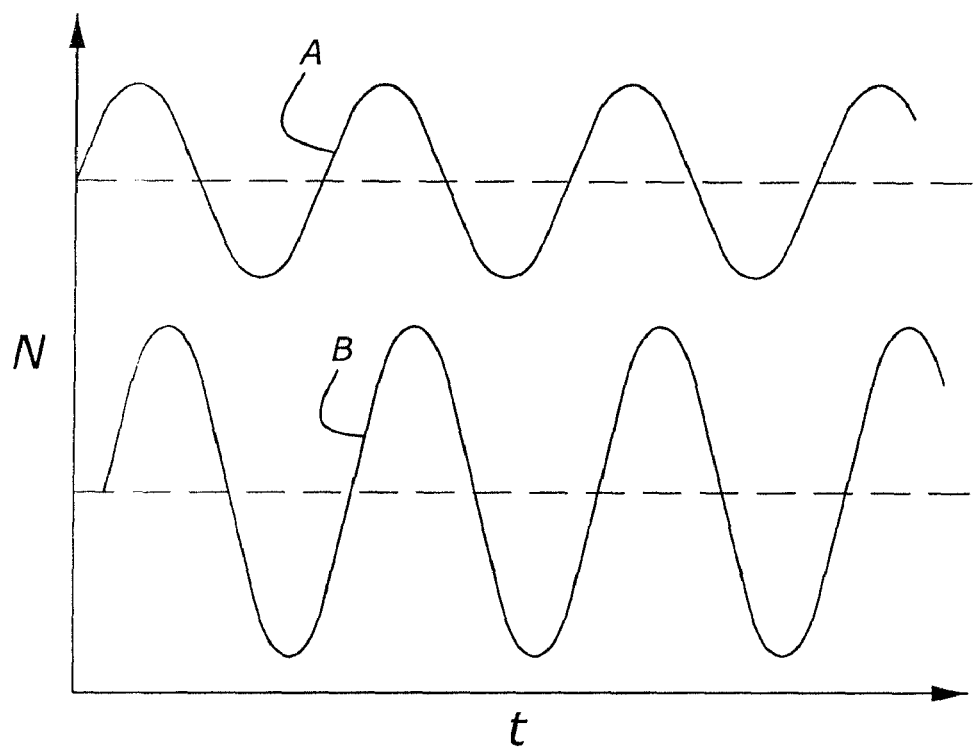
FIGS. 4 and 5 illustrate before and after characteristics showing a reduction in balance shaft rotational speed variation produced by the present disclosure.

As shown in FIG. 4, a conventional drive system having a tensioner applied to the slack side of a balance shaft drive system permits the rotational speed variation of curve B, which shows balancer speed, in response to the rotational speed variations of the engine's crankshaft, shown at curve A. The rotational speed variation shown at curve B causes unwanted noise due to the inherent backlash in the gear system extending between the balance shafts, such as the gears shown in FIG. 2.

Figure 5:
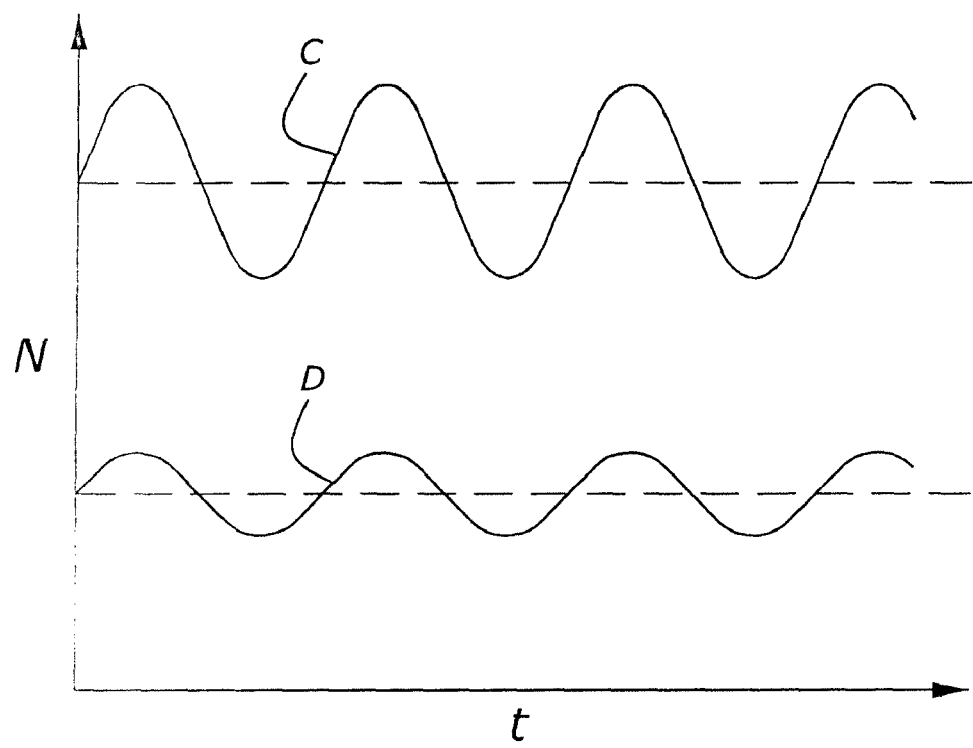

FIG. 5 illustrates diminished rotational speed variation at curve D, which is produced by the present balancer drive notwithstanding the existing magnitude of rotational speed variation for the crankshaft, shown at curve C. This beneficial reduction in rotational speed variation on the part of the balance shafts reduces unwanted noise as described above.

Figure 1:
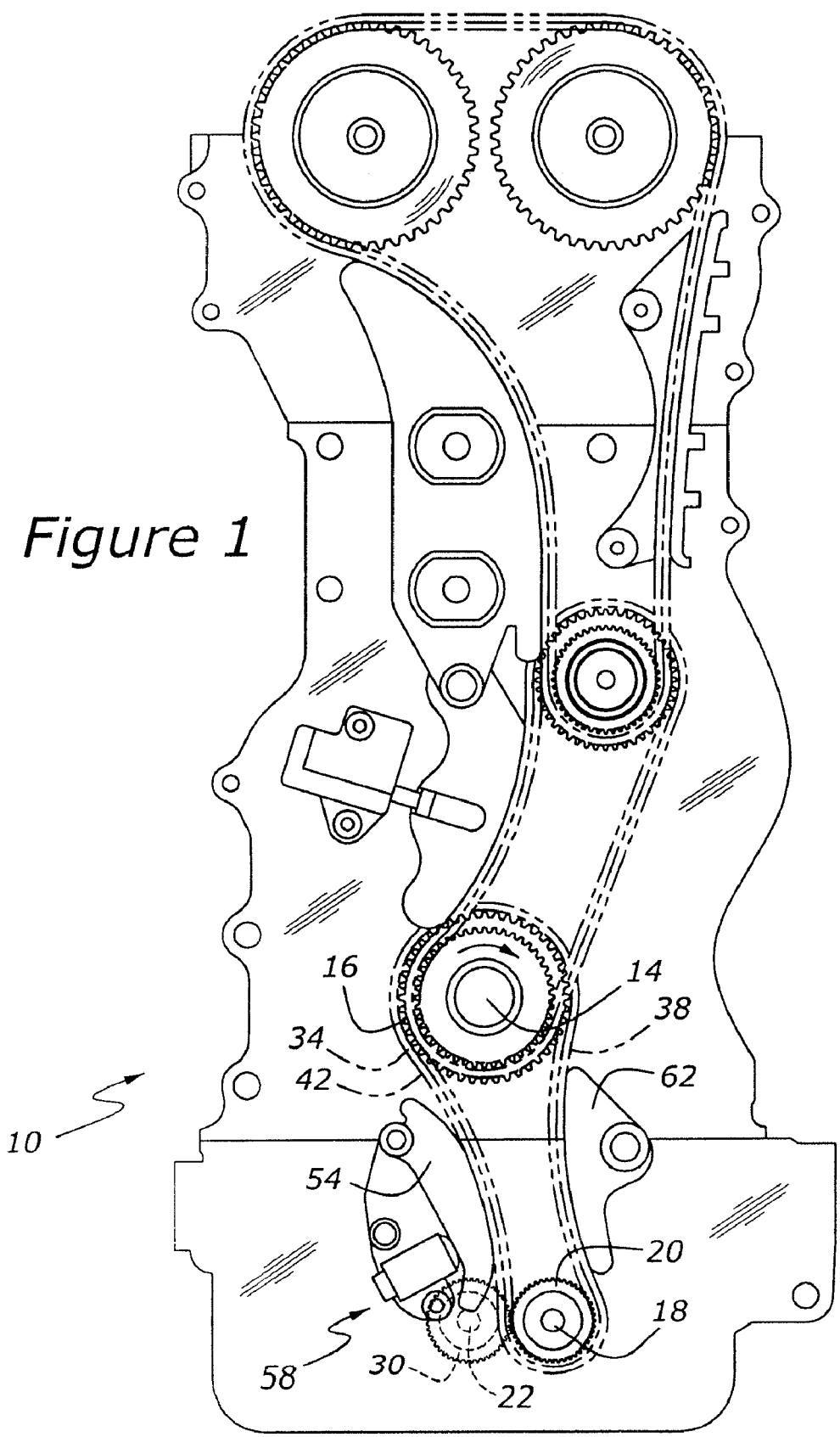
FIG. 1 is a partially schematic view of a portion of an engine having a balance shaft drive system according to the present disclosure.
Figure 2:
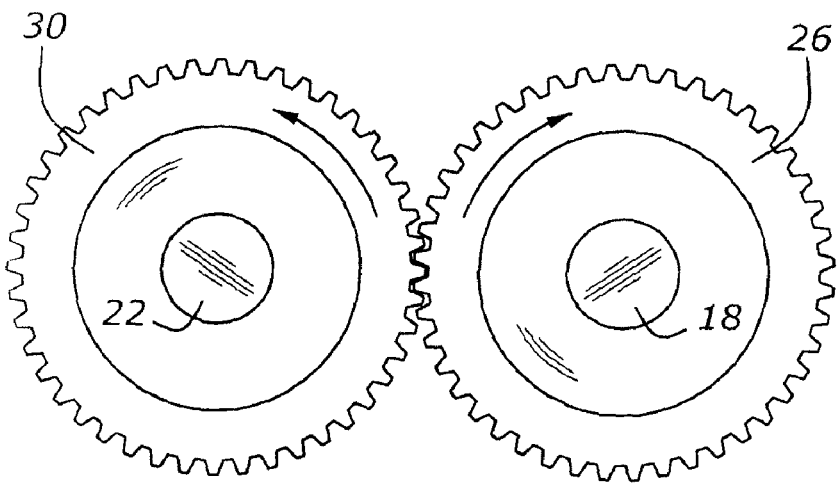
FIG. 2 illustrates drive gears attached to the ends of balance shafts according to an aspect of the present disclosure.

FIG. 1 shows an engine, 10, having a crankshaft, 14, with a crankshaft sprocket, 16, which drives a first balance shaft, 18, through a driven sprocket 20. The drive torque is conveyed by a flexible and inextensible drive element, 34, which extends between crankshaft sprocket 16 and driven sprocket 20 which, as noted above, is attached to first balance shaft 18. As shown in FIG. 2, a second balance shaft, 22, is driven from first balance shaft 18 by a driving gear, 26, which is attached to first balance shaft 18, and which meshes with a driven gear 30, which is mounted to second balance shaft 22. Gears 26 and 30 produce the counter rotation required of balance shafts 18 and 22.

As further shown in FIG. 1, a unilateral tensioner, 58, is applied to the tension side, 42, of drive element 34. Notice that no tensioner is applied to the slack side, 38, of drive element 34. In the embodiment shown in FIG. 1, a contactor, 54, which is in the form of a shoe, is pressed against tension side 42 of drive element 34 by a hydraulic driver, 58, which receives high-pressure oil from the engine's lubrication system. Guide 62, which bears upon slack side 38 of drive element 34, prevents unwanted movement of drive element 34 without imparting tension to the drive element.

Figure 3:
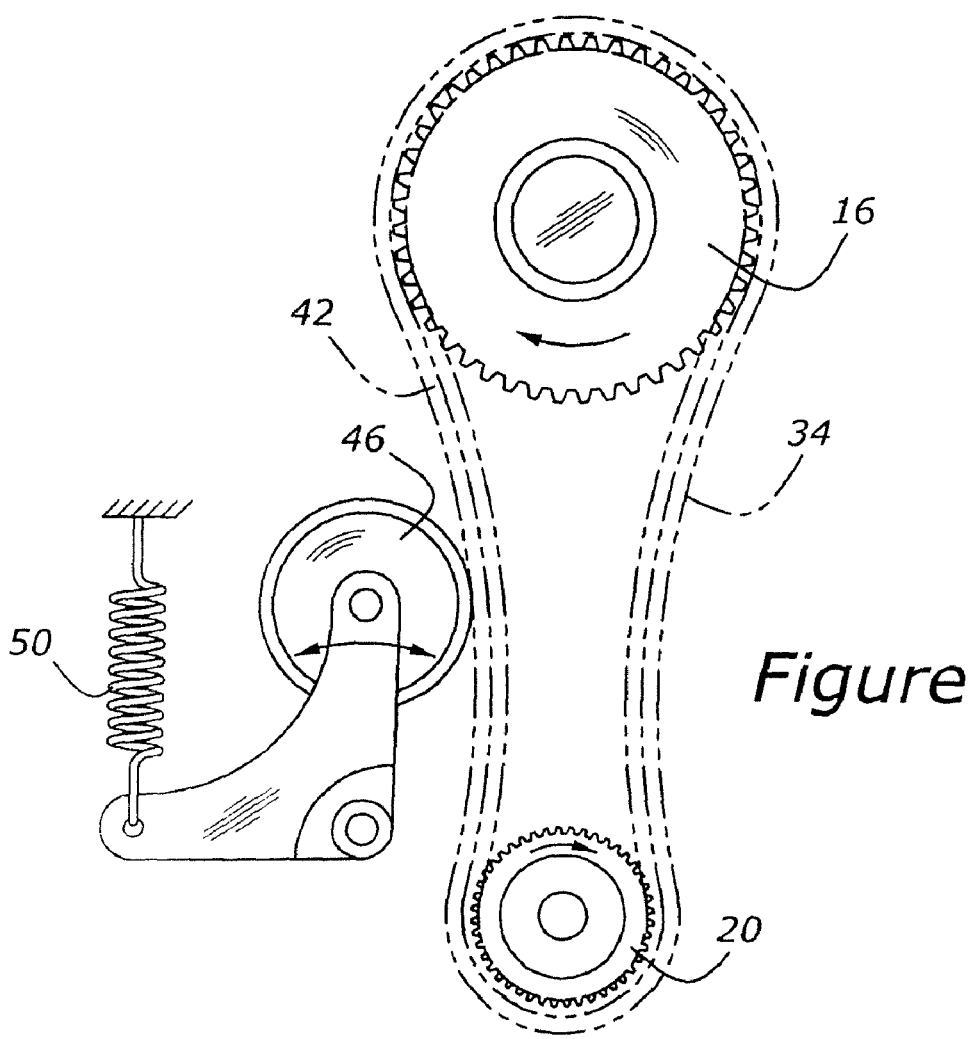
FIG. 3 illustrates the use of a roller as a single contactor employed in a tensioner on the tight side of a flexible drive element according to an aspect of the present disclosure.

In the embodiment of FIG. 3, roller 46 is applied to drive element 34 by a tension spring, 50, which urges roller 46 into contact with the tension side of drive element 34. In essence, the embodiments of both FIGS. 1 and 3 allow momentary repeated and reversible changes in the length of that portion of drive element 34 extending between balance shaft sprocket 20 and crank sprocket 16; the ability of the tensioner to accommodate this length change prevents undue acceleration and deceleration of balance shaft sprocket 20 as well as first balance shaft 18 and second balance shaft 22. In this manner, unwanted noise is controlled.

The foregoing system has been described in accordance with the relevant legal standards, thus the description is exemplary rather than limiting in nature. Variations and modifications to the disclosed embodiments may become apparent to those skilled in the art and fall within the scope of the disclosure. Accordingly, the scope of legal protection can only be determined by studying the following claims.

What is claimed is:

1. An internal combustion engine comprising:
   a crankshaft;
   a first balance shaft;
   a flexible, inextensible, drive element extending between said crankshaft and said first balance shaft, with said drive element having a slack side and a tension side;
   a second balance shaft driven by said first balance shaft; and
   a unilateral tensioning system applied to said tension side of said drive element.

2. An internal combustion engine according to claim 1, wherein said crankshaft and said flexible drive element rotate said first balance shaft at a speed which is twice the rotational speed of the crankshaft.

3. An internal combustion engine according to claim 1, wherein said flexible drive element comprises a chain.

4. An internal combustion engine according to claim 1, wherein said flexible drive element comprises a fiber reinforced elastomeric belt.

5. An internal combustion engine according to claim 1, wherein a driving gear mounted to said first balance shaft drives said second balance shaft through a driven gear mounted to the second balance shaft.

6. An internal combustion engine according to claim 1, wherein said tensioning system comprises a single contactor which is urged into a tightening position against said flexible drive element, at least in part by hydraulic pressure from a lubrication system of the engine.

7. An internal combustion engine according to claim 6, wherein said single contactor comprises a shoe which is urged into said tightening position against said flexible drive element.

8. An internal combustion engine according to claim 6, wherein said single contactor comprises a roller which is urged into said tightening position against said flexible drive element.

9. An internal combustion engine according to claim 1, wherein said tensioning system comprises a single contactor which is urged into a tightening position against said flexible drive element, at least in part by a resilient member.

10. An internal combustion engine according to claim 9, wherein said single contactor comprises a shoe which is urged into said tightening position against said flexible drive element.

11. An internal combustion engine according to claim 9, wherein said single contactor comprises a roller which is urged into said tightening position against said flexible drive element.

12. An internal combustion engine according to claim 1, further comprising a fixed guide applied to the slack side of said flexible drive element.

13. An internal combustion engine according to claim 1, wherein said unilateral tensioning system is configured to allow the portion of the flexible drive element extending between the crankshaft and the first balance shaft to repeatedly and reversibly change in length in response to variations in the rotational speed of said crankshaft.

14. An internal combustion engine comprising:
    a crankshaft;
    a first balance shaft;
    a flexible, inextensible, drive element extending between said crankshaft and said first balance shaft, with said drive element having a slack side and a tension side;
    a second balance shaft driven by said first balance shaft; and
    a unilateral tensioning system, applied to said tension side of said drive element, and configured to allow the portion of the flexible drive element extending between the crankshaft and the first balance shaft to momentarily, repeatedly, and reversibly change in length in response to variations in the rotational speed of said crankshaft.

15. An internal combustion engine according to claim 14, wherein said unilateral tensionioning system comprises a single contactor which is urged into a tightening position against said flexible drive element.

* * * * *